United States Patent
Maeda et al.

(10) Patent No.: US 9,609,890 B2
(45) Date of Patent: Apr. 4, 2017

(54) METHOD FOR PRODUCING GABA MOCHI BARLEY CONTAINING GABA AND PRODUCT THEREOF

(75) Inventors: Kousaku Maeda, Ehime (JP); Yasuo Watanabe, Ehime (JP)

(73) Assignees: MAEDA CORPORATION LIMITED, Ehime (JP); NATIONAL UNIVERSITY CORPORATION EHIME UNIVERSITY, Ehime (JP)

( * ) Notice: Subject to any disclaimer, the term of this patent is extended or adjusted under 35 U.S.C. 154(b) by 1098 days.

(21) Appl. No.: 13/580,574

(22) PCT Filed: Feb. 21, 2011

(86) PCT No.: PCT/JP2011/053750
§ 371 (c)(1),
(2), (4) Date: Aug. 22, 2012

(87) PCT Pub. No.: WO2011/105340
PCT Pub. Date: Sep. 1, 2011

(65) Prior Publication Data
US 2012/0324607 A1 Dec. 20, 2012

(30) Foreign Application Priority Data
Feb. 24, 2010 (JP) .................................. 2010-039461

(51) Int. Cl.
*A23L 1/10* (2006.01)
*A23L 33/105* (2016.01)
*A23L 7/10* (2016.01)

(52) U.S. Cl.
CPC ............. *A23L 33/105* (2016.08); *A23L 7/101* (2016.08); *A23L 7/115* (2016.08); *A23L 7/197* (2016.08); *A23L 7/198* (2016.08)

(58) Field of Classification Search
CPC .... A23L 1/1008; A23L 1/1016; A23L 1/1025; A23L 1/3051; A23L 33/105; A23L 7/115; A23L 7/101; A23L 7/197; A23L 7/198; A23V 2250/038
See application file for complete search history.

(56) References Cited

U.S. PATENT DOCUMENTS

2009/0169683 A1* 7/2009 Findlay ................. A23L 1/1016
426/72

FOREIGN PATENT DOCUMENTS

JP 2007-330129 12/2007
WO 2009/069702 6/2009

OTHER PUBLICATIONS

Banks, W., Greenwood, C.T., Walker, J.T. 1970. "Studies on the Starches of Barley Genotypes: The Waxy Starch." Starch. vol. 5. pp. 149-152.*
English Translation of Torii, E. "Study on High Production of gamma-Amino Butyric Acid as Functional Substance in Barley" 2010.*
English Translation of Nogata et al. "Generation of Free Amino Acids Using Wheat and Barley Seeds." 2006.*
Nogata et al., "Komugi, Omuhi Shushi o Riyo shita Yuri Amino Acid no Seisei", Kinki Chugoku Shikoku Nogyo Kenkyu Seika Joho. 2006. vol. 2005, pp. 233-234.*
English translation of International Preliminary Report on Patentability issued Nov. 25, 2011 in International (PCT) Application No. PCT/JP2011/053750, pp. 1-5.
E. Torii, "Mugi-rui ni Okeru Kinosei Busshitsu γ-Aminobutyric Acid no Koseisan ni Kansuru Kenkyu", Ehime University Nogakubu Oyo Seimei Kagaku Course Sotsuron Kokai Happyokai, Feb. 23, 2010, considered as disclosed not in English.
International Search Report issued Apr. 19, 2011 in International (PCT) Application No. PCT/JP2011/053750, pp. 1-2.

* cited by examiner

*Primary Examiner* — Nikki H Dees
(74) *Attorney, Agent, or Firm* — Wenderoth, Lind & Ponack, L.L.P.

(57) ABSTRACT

A technique for highly efficient production of γ-amino butyric acid (GABA) using mochi barley of the group of mules barley, as a raw material. The technique converts glutamic acid into GABA due to the glutamate decarboxylase contained in the mochi barley so GABA-mochi barley grains and GABA-mochi barley bran and GABA-containing bran supernatant can be produced highly-efficiently by mixing mochi barley grains, which have been polished in a barley milling device to an extent of 2% or more and less than 20%, with a glutamic acid solution, which has a concentration of 0.1 to 3% and a pH value of 2 to 9, and soaking the barley in the solution at room temperature for 1 hour or more to overnight or, after soaking in the solution similarly for 1 hour or more to overnight, draining the barley grains, and keeping it overnight at room temperature.

7 Claims, 8 Drawing Sheets

METHOD FOR PRODUCING GABA MOCHI BARLEY CONTAINING GABA AND PRODUCT THEREOF

BACKGROUND OF THE INVENTION

1. Technical Field

The present invention relates to a method for producing γ-amino butyric acid (GABA) mochi barley and GABA mochi barley bran, each containing GABA, and GABA-containing bran supernatant, which enables easy and highly efficient production of GABA using grain crops, in particular, mochi barley, and a product thereof.

2. Background Art

GABA is an abbreviation of γ-amino butyric acid (i.e., gamma amino butyric acid) that is a non-protein amino acid and is not included in a protein. For the descriptions given below including the figures, γ-amino butyric acid is expressed as GABA.

In Patent Document 1, disclosed is a method for producing edible sesame with an increased content of GABA. However, for grain crops including naked (mules) barley, mochi barley, barnyard millet, foxtail millet, and *panicum miliaceum*, development of a food material containing a large amount of GABA has not been made yet.

PATENT DOCUMENT

Patent Document 1: Japanese Patent Application Publication No. 2007-330129

SUMMARY OF THE INVENTION

Problems to be Solved by the Invention

Problems to be solved is that GABA mochi barley grains and GABA mochi barley bran, each containing a large amount of GABA, cannot be mass-produced from mochi barley, and therefore the invention provides a technique for highly efficient production of GABA using grain crops, in particular, mochi barley.

Means for Solving the Problems

The major characteristics of the invention is that glutamic acid is converted into γ-amino butyric acid (GABA) due to the action of glutamate decarboxylase contained in the mochi barley by mixing mochi barley grains, which have been polished with a barley milling device to an extent of 2% or more and less than 20%, with a glutamic acid (L-glu) solution having a concentration of 0.1 to 3% and a pH value adjusted to 2 to 9, and soaking the mochi barley grains in the solution at room temperature for 1 hour or more to overnight (about 15 hours); or, after soaking in the solution similarly for 1 hour or more to overnight, draining the mochi barley grains, and keeping the mochi barley grains overnight at room temperature, and as a result, γ-amino butyric acid is highly efficiently produced using mochi barley as a raw material or substrate.

Effects of the Invention

According to the method for producing GABA mochi barley having a high GABA content that is the present invention, polished grains of mochi barley that are obtained by polishing unpolished barley are mixed with a glutamic acid solution with adjusted concentration and kept so that the action of glutamate decarboxylase contained in the mochi barley is utilized, and thus mass production of GABA from mochi barley can easily be achieved by combining polishing degree of mochi barley and pH value of glutamic acid with adjusted concentration and then keeping the mixture of them for a long time. The present invention contains the method for producing mochi barley bran left after polishing an outer layer of surface of mochi barley with a barley milling device, and according to this production method, GABA-containing bran supernatant is produced by using, as a raw material, mochi barley bran. Examples of a device for polishing unpolished barley are a barley milling device and ice milling device. Dried kernels of GABA mochi barley and mochi barley bran, each containing GABA, and GABA-containing bran supernatant can advantageously be used as a food material for producing food products containing GABA.

DETAILED DESCRIPTION OF THE INVENTION

According to the present invention, to produce mochi barley grains and mochi barley bran, each containing GABA at a high content, and GABA-containing bran supernatant, a method for conversion into GABA in barley grains and barley bran by adding L-glutamic acid as a raw material of GABA and by keeping them at room temperature of about 25° C. is employed. According to the method, a GABA-enriched mochi barley products, such as a GABA-enriched polished mochi barley grains, a GABA-enriched mochi barley bran product, and GABA-containing mochi barley bran supernatant are obtained.

Example 1

Figure 1:
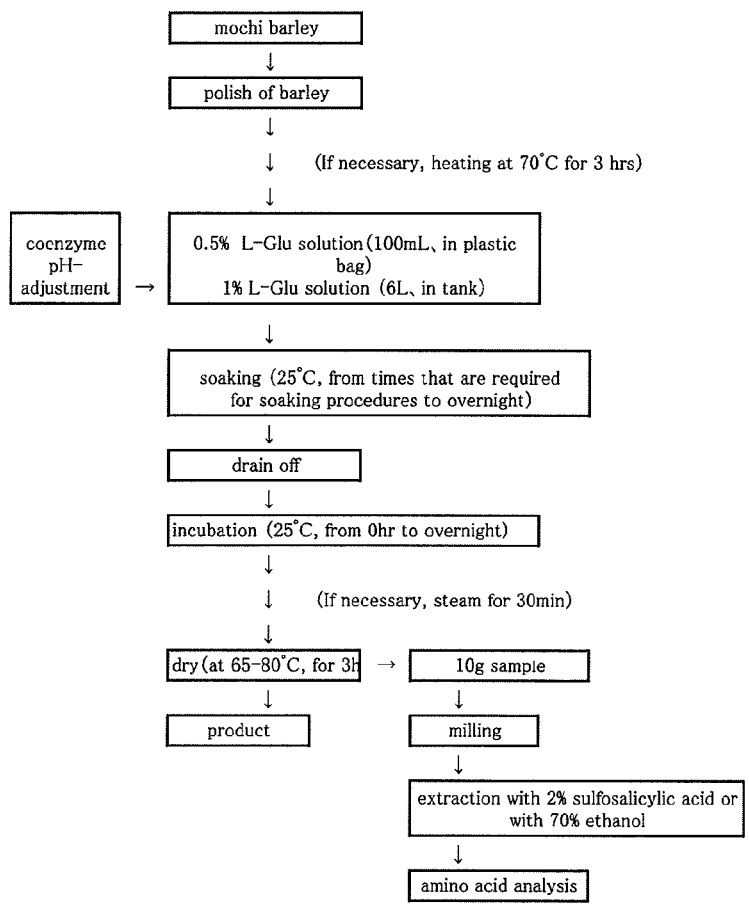
FIG. 1 illustrates a process flow chart for producing GABA mochi barley, in which a method of performing the process for producing a GABA mochi barley product from unpolished barley is presented (Example 1).

FIG. 1 relates to one embodiment of a process for the method for highly-effective production of a GABA mochi barley grains and a GABA mochi barley product from unpolished barley according to the present invention.

With reference to the given numerals, 50 g of grain crops like mules barley and mochi barley 1 were polished with a rice milling device to give polished barley 2, and at step #4 which was then soaked overnight in 100 ml of L-glutamic acid solution at pH of from 3 to 5 at room temperature, and at step #5 which was drained off, and at step #6 which was further kept overnight at the temperature in a state where it is still somewhat wet.

At Step #7, the incubated barley grains which have been treated with glutamic acid were dried for 3 hours at 65° C.

Sample 8 of the dried barley grains was ground with a bean mill.

To the ground Sample 3, 30 ml of 2% (W/V) of sulfosalicylic acid was added and shaken vigorously for 10 minutes.

After centrifugal separation (1000×g, for 10 min), the supernatant was recovered as a sample for GABA analysis.

The GABA amount in a sample for GABA analysis was quantified by an apparatus for amino acid analysis (HPLC method).

Figure 2:
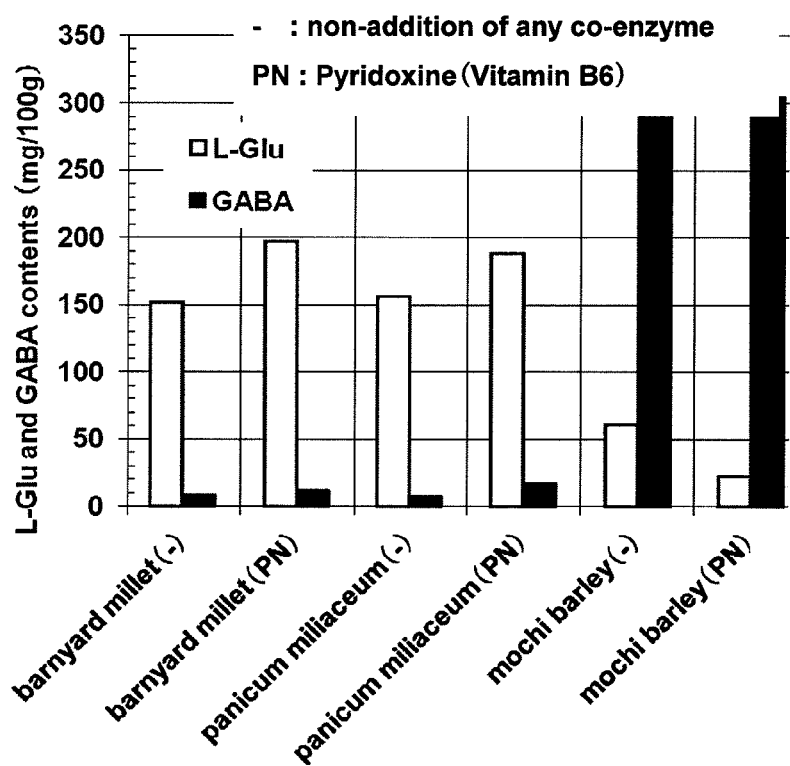
FIG. 2 is a graph illustrating the content of GABA produced in 100 g of mochi barley, as for the cases where pyridoxine (PN vitamin B6) is contained in glutamic acid solution and for the cases where pyridoxine (PN vitamin B6) is not contained in glutamic acid solution (Example 1).

Result of the GABA content obtained by measurement of the sample of the previous paragraph 0011 is illustrated in FIG. 2.

According to the result of the previous paragraph 0017, GABA was produced in mochi barley at almost the same level for the case where pyridoxine (vitamin B6) is added and the case where no pyridoxine is added. Glutamic acid as a raw material was almost disappeared.

The mochi barley related to the results of the previous paragraphs 0017 and 0018 was mochi barley kernels that were obtained by removing an outer layer of surface to a certain extent with a barley milling devise. Herein below, polished mochi barley is referred to as polished barley, and a remaining outer layer of surface of mochi barley is referred to as mochi barley bran, specifically.

It was then determined whether the high production of GABA in mochi barley is caused by polishing. As a sample, unpolished or polished mochi barley grains were soaked in a glutamic acid solution adjusted to pH 4 or pH 5 in the presence or absence of pyridoxine (vitamin B6), and treated according to the descriptions of the previous paragraphs 0011 and 0012.

Figure 3:
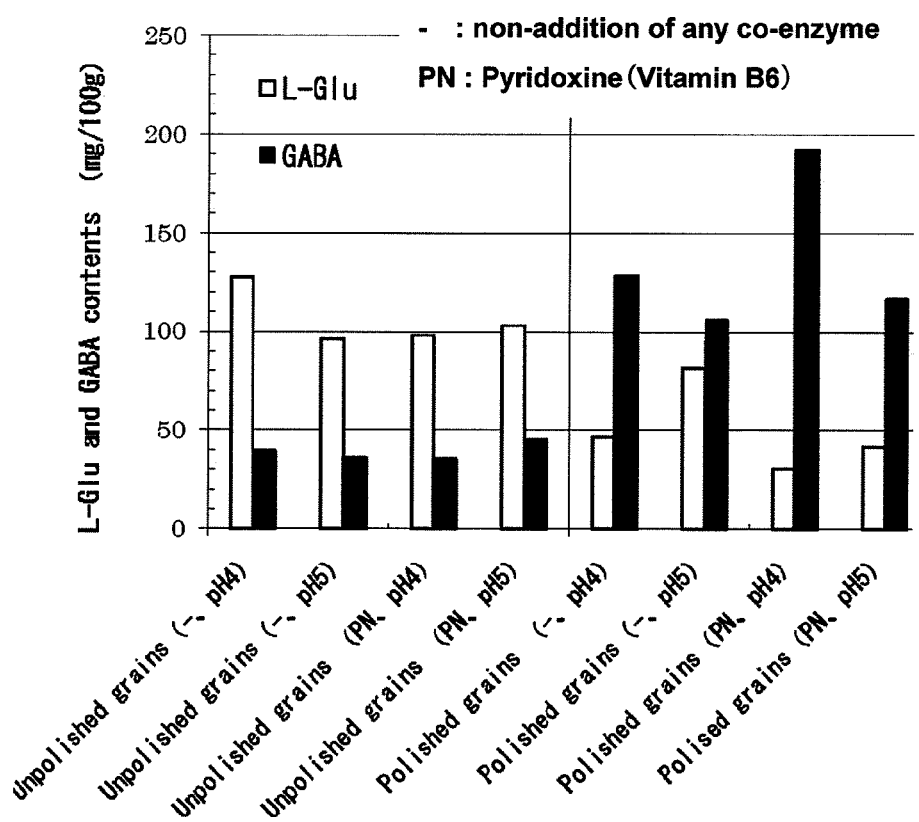
FIG. 3 is a graph illustrating the content of GABA produced at various pH of glutamic acid solution in 100 g of unpolished or polished mochi barley (Example 1).

Analysis results of the sample of the previous paragraph 0020 are illustrated in FIG. 3. Regardless of the presence or absence of pyridoxine, a high amount of GABA was produced in the polished mochi barley at pH 4. On the other hand, little GABA was produced in the unpolished mochi barley even after the same treatment, and the glutamic acid as a raw material was collected.

As indicated in the previous paragraphs 0020 and 0021, it was found that the polishing treatment is essential for GABA production in mochi barley. Accordingly, the procedure of the previous paragraphs 0011 and 0012 was carried out for unpolished barley and barley samples that were polished to an extent of 2% to 30% of degree of polishing.

Figure 4:
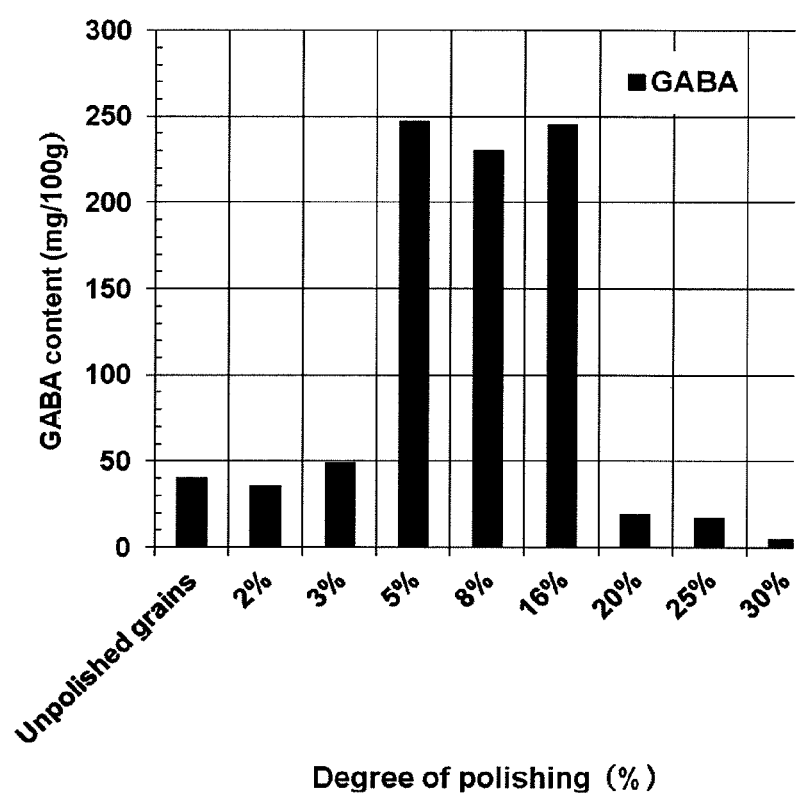
FIG. 4 is a graph illustrating the content of GABA at various degree of polishing of mochi barley in the horizontal axis, i.e., from unpolished barley to polished barley with 30% degree of polishing (Example 1).

Analysis results of the samples of the previous paragraph 0022 are illustrated in FIG. 4. Favorable GABA production was observed at the degree of polishing between 5% and 16%.

Then, it was further determined which concentration (%) of a glutamic solution for soaking is effective to produce favorable GABA production for polishing-treated mochi barley. Polished mochi barley was soaked in a 0% to 3% sodium glutamate solution which has been adjusted to pH 4.

Figure 5:
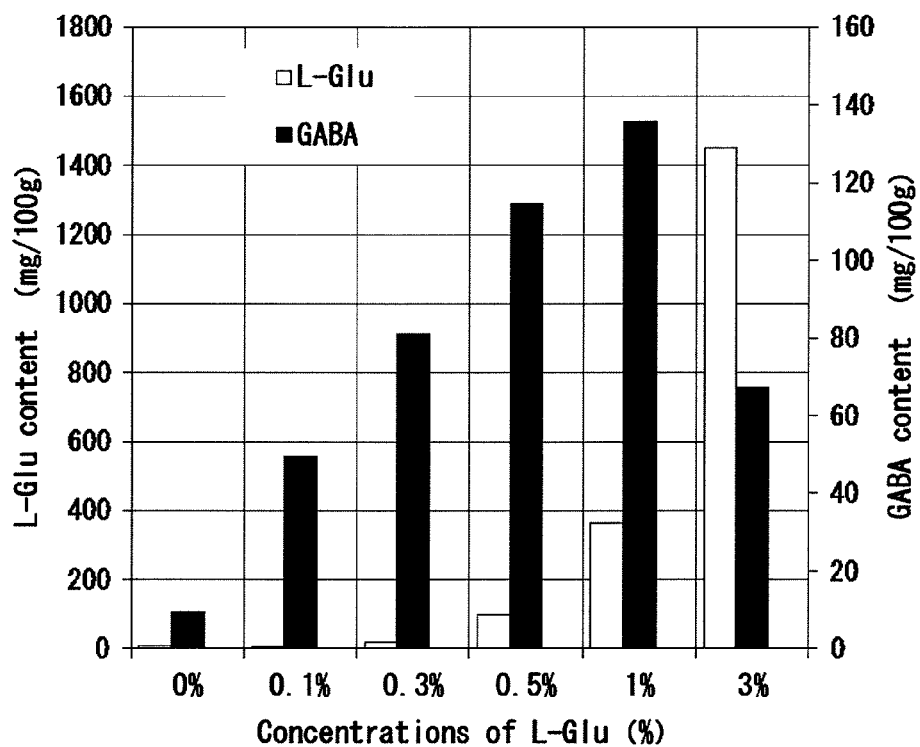
FIG. 5 is a graph illustrating the content of GABA produced in 100 g of dried grains in the solution which contains various concentration of glutamic acid in the horizontal axis (Example 1).

Analysis results of the sample of the previous paragraph 0024 are illustrated in FIG. 5. Favorable GABA production was confirmed for the concentration of between 0.1% and 3%.

As illustrated in the process for producing GABA mochi barley (i.e., FIG. 1), grains of polished mochi barley were initially subjected to a heating treatment at 65° C. to 70° C. for about three hours or so for the experiments described above. The results of the treatment are then examined.

GABA production amount was measured for the sample with and without the heating treatment. As a result, almost no difference is recognized between them. Meanwhile, it is expected that sterilization is achieved by drying polished mochi barley sample by heating-treatment at 65° C. to 70° C. for about three hours, which is an effective preservation method from the view point of food hygiene.

As illustrated in FIG. 5, based on the results of analyzing GABA content of GABA mochi barley given above including that mochi barley containing GABA at high concentration can be obtained by soaking polished mochi barley in a glutamic acid solution with concentration of from 0.1% to 3%, it was determined which pH range of a glutamic acid solution is expected to give favorable GABA production.

Figure 6:
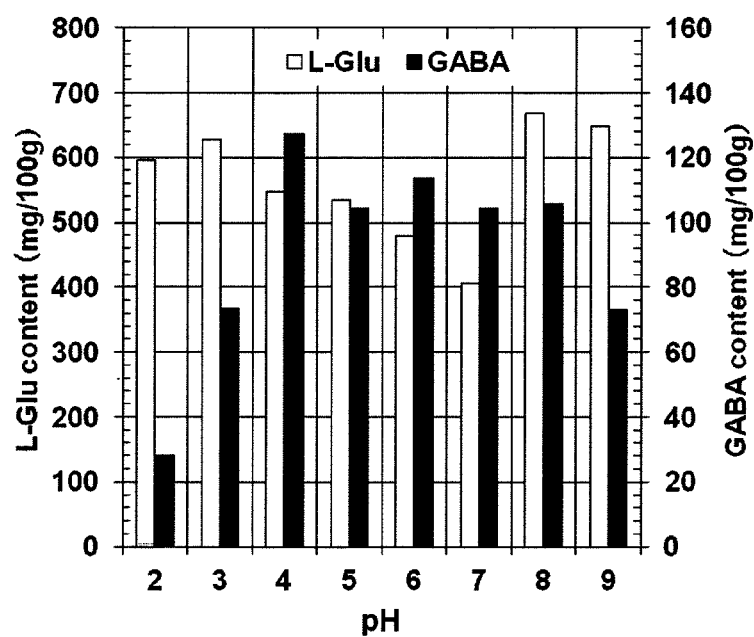
FIG. 6 is a graph illustrating the content of GABA produced in 100 g at various pH of prepared glutamic acid solution in the horizontal axis (Example 1).

Analysis results of the sample of the previous paragraph 0028 are illustrated in FIG. 6. Favorable GABA production was obtained by adjusting a glutamic acid solution to pH 3 to 9.

Next, an investigation was made as to the time for soaking polished mochi barley in a glutamic acid solution. Soaking in a glutamic acid solution was carried out for 1 hour or more to overnight (about 15 hours). After draining, the polished mochi barley grains were kept overnight at room temperature (25° C.)

Figure 7:
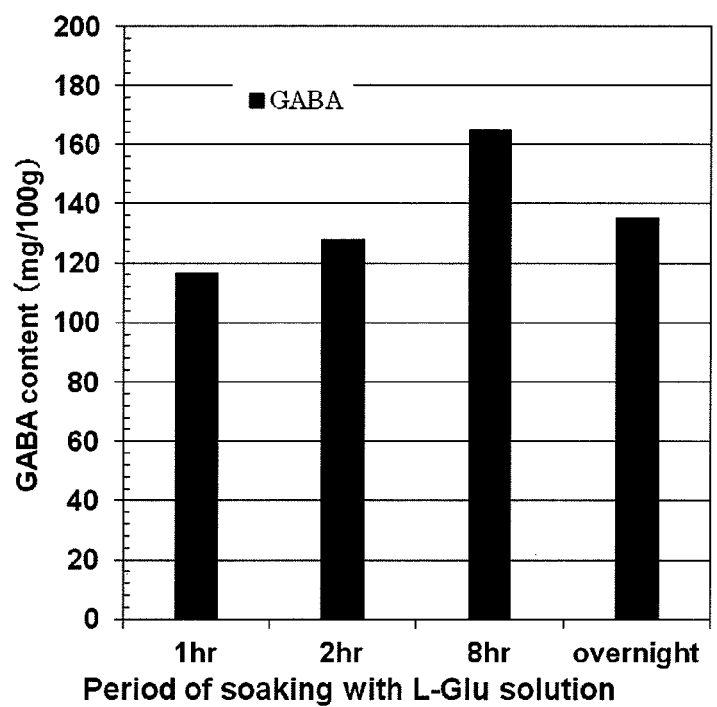
FIG. 7 is a graph illustrating the content of GABA produced in 100 g for various time for soaking mochi barley in glutamic acid solution in the horizontal axis (Example 1).

Analysis results of the sample of the previous paragraph 0030 are illustrated in FIG. 7. Favorable GABA production was observed when soaking in a glutamic acid solution was carried out for 1 hour or more to overnight.

In the experiment of the previous paragraph 0030, the polished mochi barley grains after draining were further kept overnight (about 15 hours) at room temperature. When it was soaked overnight in a glutamic acid solution, GABA was produced in accordance with the degree of polishing as illustrated in FIG. 4. Almost the same level of GABA production was observed even when incubation after draining was skipped.

Example 2

Figure 8:
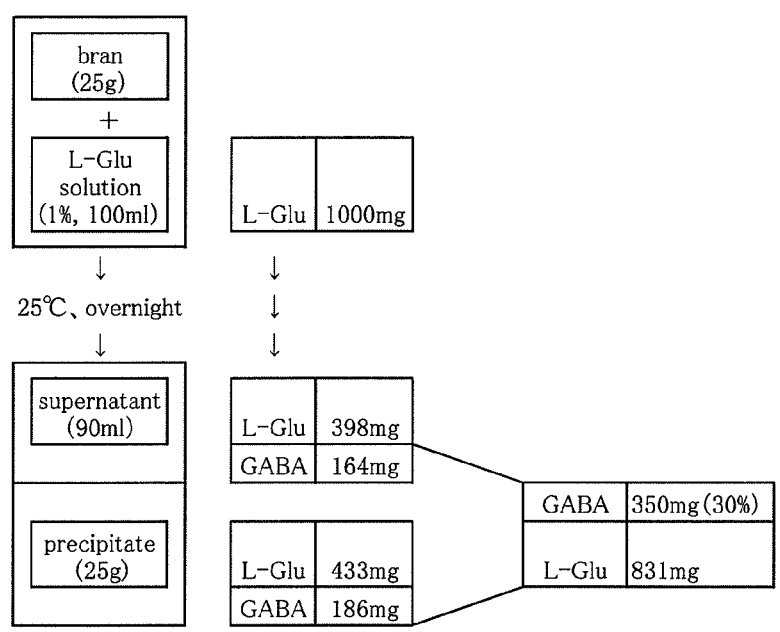
FIG. 8 is a drawing which demonstrates that GABA at the content of 30% is produced in an experimentation for barley bran left by polishing mochi barley to an extent of 20 to 25%, in which the mochi barley bran and a glutamic acid solution are mixed with each other and kept overnight (Example 2).

Explanations are given for FIG. 8 with reference to the numerals. When mochi barley bran and a glutamic acid solution (#12) are mixed with each other (Step #9) and kept overnight (about 15 hours), 30% GABA production (#11) was observed for the mochi barley bran and bran supernatant (i.e., supernatant after centrifugal separation). Centrifugal separation treatment (1000×g, for 10 min, Step #10)) was carried out. As a result, the supernatant (solution) and bran (precipitates) were obtained (#10). Processes and results of the experiment are illustrated in FIG. 8. After mochi barley was polished to 20 to 25% with a barley milling device, a GABA mochi barley bran product can be produced by using the remaining bran as a raw material. Further, the supernatant obtained after the centrifugal treatment can be used as GABA-containing mochi barley bran supernatant. Drying GABA mochi barley bran by heat treatment for about 3 hours at 65° C. to 70° C., which achieves sterilization, is an effective preservation method.

According to the production method given in the Examples 1 and 2, GABA mochi barley and GABA mochi barley bran, each containing GABA, and GABA-containing bran supernatant are produced from unpolished mochi barley, and therefore unpolished mochi barley can fully be utilized as a food material without wasting any of it.

INDUSTRIAL APPLICABILITY

A GABA-containing food material produced by a production method according to the present invention can be applied to various food materials by grinding and then adding the GABA-containing mochi barley product to other food material, during a process for producing noodles including Japanese noodles or pasta, by cooking steamed rice in which GABA mochi barley grains are mixed, by producing a food product using GABA barley bran supernatant, or by adding it into other food products, for example.

REFERENCE NUMERALS

1 MOCHI BARLEY
2 MILLING
3 L-GLUTAMIC ACID
4 SOAKING
5 DRAINING
6 KEEPING TEMPERATURE
7 DRYING
8 SAMPLE
9 MIXING MOCHI BARLEY BRAN AND GLUTAMIC ACID SOLUTION
10 KEEPING OVERNIGHT (ABOUT 15 HOURS)
11 GABA PRODUCTION
FIG. 1
1 MOCHI BARLEY
2 MILLING
(IF NECESSARY, HEATING (70° C., FOR 3 HOURS))
補因子 pH 調整 Co-factor (Co-enzyme) pH ADJUSTMENT
3 0.5% L-Glu SOLUTION (100 mL, IN PLASTIC BAG) 1% L-Glu SOLUTION (6 L, IN TANK)
4 SOAKING (25° C., TIME REQUIRED FOR SOAKING OR MORE TO OVERNIGHT)
5 DRAINING
6 KEEPING (25° C., 0 HOUR OR MORE TO OVERNIGHT) (IF NECESSARY, STEAMING (30 MINUTES))
7 DRYING (65 TO 80° C., 5 HOURS)
製品 PRODUCT
8 10 g SAMPLE
ミル MILL
EXTRACTING WITH 2% SULFOSLAICYLIC ACID solution OR 70% ETHANOL
アミノ酸分析 AMINO ACID ANALYSIS
FIG. 2
WITHOUT Co-factor (or co-enzyme)
PN: PYRIDOXINE (VITAMIN B6)
CONTENT OF L-Glu AND GABA (mg/100 g)
BARNYAR MILLET (–)
BARNYAR MILLET (PN)
PANICUM MILIACEUM (–)
PANICUM MILIACEUM (PN)
MOCHI BARLEY (–)
MOCHI BARLEY (PN)
FIG. 3
–: WITHOUT Co-factor (or co-enzyme)
PN: PYRIDOXINE (VITAMIN B6)
CONTENT OF L-Glu or GABA (mg/100 g)
玄麦 UNPOLISHED BARLEY
精麦 POLISHED BARLEY
FIG. 4
CONTENT OF GABA (mg/100 g)
玄麦 UNPOLISHED BARLEY
精白度 DEGREE OF POLISHING (%)
FIG. 5
CONTENT OF L-Glu (mg/100 g)
CONTENT OF GABA (mg/100 g)
L-Glu CONCENTRATION (%)
FIG. 6
CONTENT OF L-Glu (mg/100 g)
CONTENT OF GABA (mg/100 g)
FIG. 7
CONTENT OF GABA (mg/100 g)
1 HOUR
2 HOURS
6 HOURS
OVERNIGHT
TIME FOR SOAKING IN L-Glu SOLUTION
FIG. 8
BRAN (25 g)
L-Glu SOLUTION (1%, 100 ml)
25° C., OVERNIGHT
SOLUTION (90 ml)
Precipitate (25 g)

The invention claimed is:

1. A method for producing mochi barley containing γ-amino butyric acid (GABA) comprising
polishing mochi barley to an extent of 3% or more and less than 20%, and
soaking the mochi barley that was polished in a glutamic acid solution,
wherein the mochi barley belong to the group of mules barley.

2. The method for producing mochi barley containing γ-amino butyric acid (GABA) according to claim 1,
wherein the polishing is performed by a barley milling device that removes an outer layer of a surface of unpolished barley.

3. The method for producing mochi barley containing γ-amino butyric acid (GABA) according to claim 1,
wherein sodium glutamate or glutamic acid is used in the glutamic acid solution for soaking the mochi barley.

4. The method for producing mochi barley containing γ-amino butyric acid (GABA) according to claim 3,
wherein the glutamic acid solution is a solution having concentration of 0.1% to 3% and a pH of 3 to 9.

5. The method for producing mochi barley containing γ-amino butyric acid (GABA) according to claim 1,
wherein the soaking occurs for at least one hour at room temperature with a ratio of 2 kgs of mochi barley per 6 liters of the glutamic acid solution.

6. The method for producing mochi barley containing γ-amino butyric acid (GABA) according to claim 5,
wherein after the soaking occurs, the mochi barley is drained and kept at room temperature.

7. The method for producing mochi barley containing γ-amino butyric acid (GABA) according to claim 1, wherein the mochi barley is polished to an extent of 5% or more and less than 16%.

\* \* \* \* \*